United States Patent [19]

Lemoine et al.

[11] 4,230,530
[45] Oct. 28, 1980

[54] SELF-CLEANING WATER DISTILLER WITH INTERMITTENT OVERFLOW

[75] Inventors: Kenneth D. Lemoine, Box 476, Gravette, Ark. 72736; Robert R. Keegan, Fayetteville, Ark.

[73] Assignee: Kenneth D. Lemoine, Gravette, Ark.

[21] Appl. No.: 972,352

[22] Filed: Dec. 22, 1978

[51] Int. Cl.² ............................................. B01D 3/02
[52] U.S. Cl. .................................... 202/180; 202/181; 202/193; 202/206; 202/234; 203/10; 203/DIG. 25
[58] Field of Search ............... 202/176, 180, 181, 160, 202/153, 166, 167, 206, 190–196, 185 R, 185 C, 234, 83; 203/39, 10, 11, 1, 99, 100, DIG. 2, DIG. 17, DIG. 25, 22

[56] References Cited

U.S. PATENT DOCUMENTS

| | | | |
|---|---|---|---|
| 1,116,804 | 11/1914 | Daley | 202/166 |
| 3,340,157 | 9/1967 | Weiss | 202/180 |
| 3,532,606 | 10/1970 | Sibert | 202/180 |
| 3,575,815 | 4/1971 | Sech | 202/176 |
| 3,696,003 | 10/1972 | Fitch et al. | 202/181 X |
| 3,849,260 | 11/1974 | Ruckstuhl | 202/181 |
| 3,907,683 | 9/1975 | Gilmont | 202/180 |
| 4,081,331 | 3/1978 | Weiss | 203/DIG. 2 |
| 4,089,749 | 5/1978 | Karamian | 202/181 X |
| 4,110,170 | 8/1978 | Kirschman | 202/181 X |
| 4,113,571 | 9/1978 | Nygards | 202/181 X |

Primary Examiner—Wilbur L. Bascomb, Jr.
Attorney, Agent, or Firm—Robert R. Keegan

[57] ABSTRACT

There is disclosed a water distiller, primarily for producing water for human consumption which includes a boiler, a distillation tower extending about two or more feet above the boiler, and a steam conduit exiting from near the top of the tower leading into a helically grooved condensation tube with a water-cooled jacket. The boiler and tower are of uniform cross-section to facilitate cleaning. The water jacket has a water inlet located in the bottom and an exit orifice for preheated input water at the top. A conduit from the orifice leads to an evaporator for volatile impurities on top of the tower, and a conduit for preheated input water leads to the bottommost part of the boiler from the evaporator. An overflow conduit with an intermittent siphon is provided connected to the bottom of the boiler; the highest and lowest points of the siphon serve to automatically regulate the maximum and minimum depths of water in the boiler.

12 Claims, 5 Drawing Figures

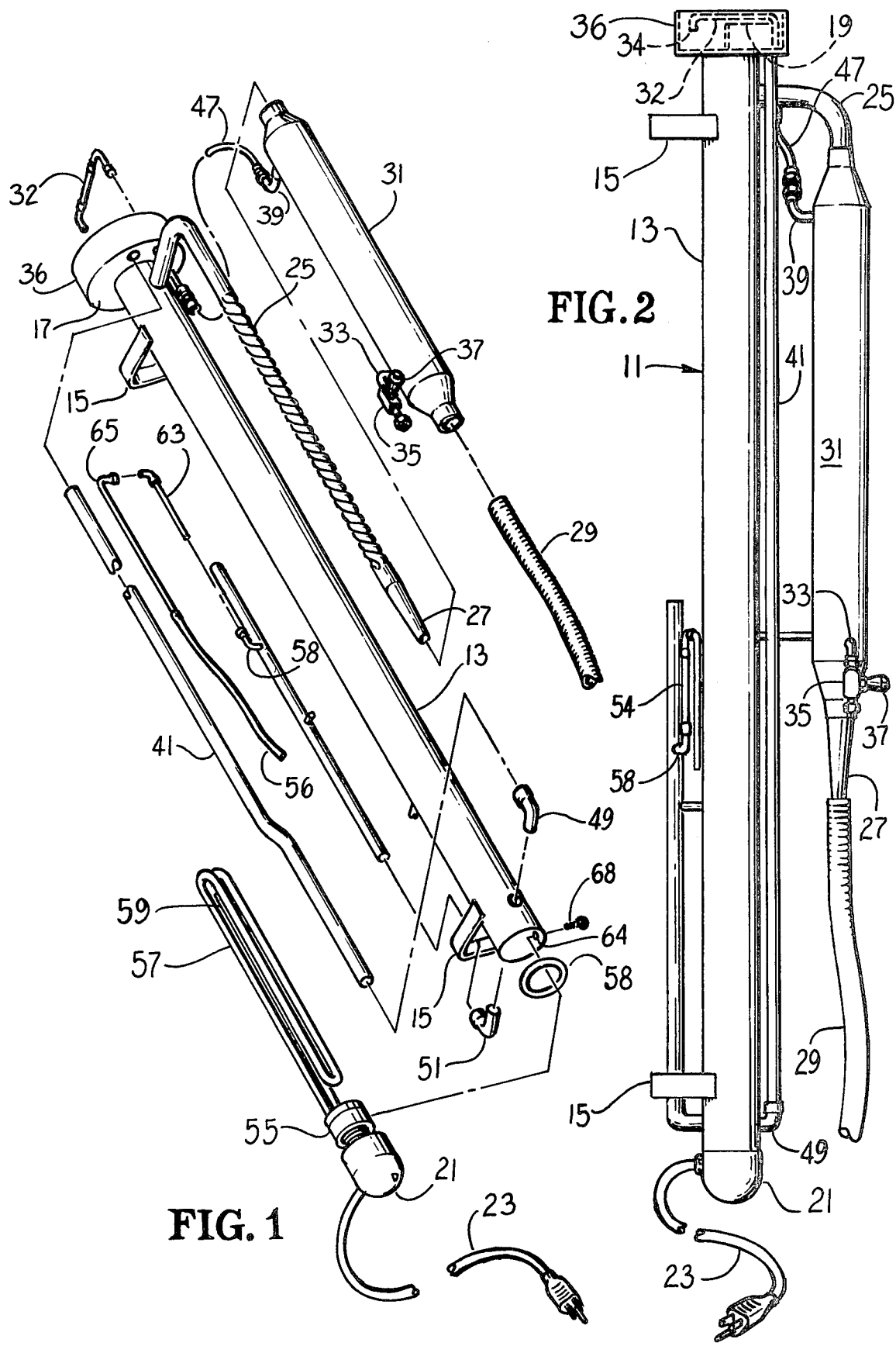

SELF-CLEANING WATER DISTILLER WITH INTERMITTENT OVERFLOW

As water pollution becomes more serious and the facts about it become better known, there is increasing effort to provide apparatus whereby water for human consumption may be purified in the home or in places of business. Various approaches are employed and are incorporated in apparatus offered commercially. These approaches include filtration, chemical treatment, heating or boiling, and distillation. Of these, only distillation offers the capability of producing truly pure water. Even distillation does not necessarily provide pure water, and the apparatus and manner in which the distillation is carried out is of utmost importance.

The production of virtually pure water is not a simple procedure due to the complications which have been introduced by widespread chemical pollution of water sources. Many, if not all, of our water sources today contain significant amounts of toxic pollutants. As described in the Clean Water Act, a toxic pollutant is a chemical which having been discharged into the environment causes death, disease, behavioral abnormalities, cancer, genetic mutations, physiological malfunctions (including malfunctions in reproduction), or physical deformations in living organisms or their offspring.

The list of common toxic pollutants is too long to recite in detail, but it includes many herbicides such as 2,4-D and 2,4,5-T, pesticides such as DDT, Aldrin and Endrin; heavy metals such as mercury and cadmium; and organic chemicals such as Mirex, Kepone and PCB's.

All these water pollutants are not removed by merely boiling the tap water and condensing all the vapors to produce the "purified" product. If the distilling apparatus is not most carefully designed the pollutants may be carried through the distillation process and remain in the "purified" water produced from the distiller.

Of course, laboratory distillation apparatus has been known for decades, even centuries, and, especially by multiple distillation, water may be purified to just about any extent desired or until impurities are virtually undetectable. It is, however, quite impractical to use such complicated and expensive laboratory distillation apparatus for the production of household drinking water.

The present invention provides a relatively simple but effective distiller for production of drinking water. The apparatus according to the invention is first of all effective to remove all pollutants whether solid, gaseous, organic or inorganic to the point of near immeasurability. The apparatus is self-cleaning in respect to all dissolved and most solid residuals and provides long periods of operation between cleaning operations. The cleaning effect of its overflow system is enhanced by an intermittent siphon which causes short periods of relatively high flow rate overflow to purge particulates from the boiler. At the same time, there is no hidden hazard as with filter systems which can become ineffective without one's knowledge or can even build up a breeding ground for organic pollutants. The energy required for operation of the distiller is kept to a low value as is the quantity of water used for carrying away impurities.

The simplicity of the apparatus is achieved by using the principle of fractional distillation together with a long vertical column for the vapors for optimum rejection of all forms of pollutants. The preheating of the water supplied to the boiler not only conserves energy but also results in a preliminary rejection of low boiling point or gaseous pollutants. This is facilitated by an evaporator which exposes the preheated water in a shallow pool to atmospheric pressure. The distiller can be operated with a low temperature distillate output which conserves energy and improves efficiency for most water supply conditions, but may also be operated with a high temperature distillate output in special circumstances where troublesome pollutants such as chloroform are present in the water and must be removed.

The distiller incorporates no pump and thus presents no possibility of water pollution from pump lubricant or wear particles. It also requires no cooling air circulating fan and thus has no moving mechanical parts requiring maintenance or producing noise or vibration. Operating only part of one day, the distiller can readily produce five gallons of pure distilled water which is normally more than adequate for even a large household.

In addition to providing the features and advantages described above, it is an object of the present invention to provide a distiller for water for human consumption or other purposes requiring no moving mechanical parts which employ a periodic overflow flushing mechanism for self-cleaning and provides preheating of water at atmospheric pressure for removal of dissolved gases.

It is another object of the present invention to provide a distiller for water for human consumption or other purposes wherein the apparatus is provided with an overflow tube in the form of an intermittent siphon periodically taking excess water flow from near the bottom of the boiler of the distiller, thus removing dissolved and suspended solid residuals from the boiling water.

It is yet another object of the present invention to provide a distiller for water for human consumption or other purposes having an extended vertical chamber above the surface of the boiler water with an evaporator cup mounted above the vertical chamber heated by the steam therein and supplied with preheated input water which flows through the evaporator cup to the boiler of the distiller.

Other objects and advantages of the present invention will be apparent from consideration of the following description in conjunction with the appended drawings in which:

FIG. 1 is an exploded view of distiller apparatus according to the present invention;

FIG. 2 is a front elevational view of the apparatus of FIG. 1;

Figures 3, 4, 5:
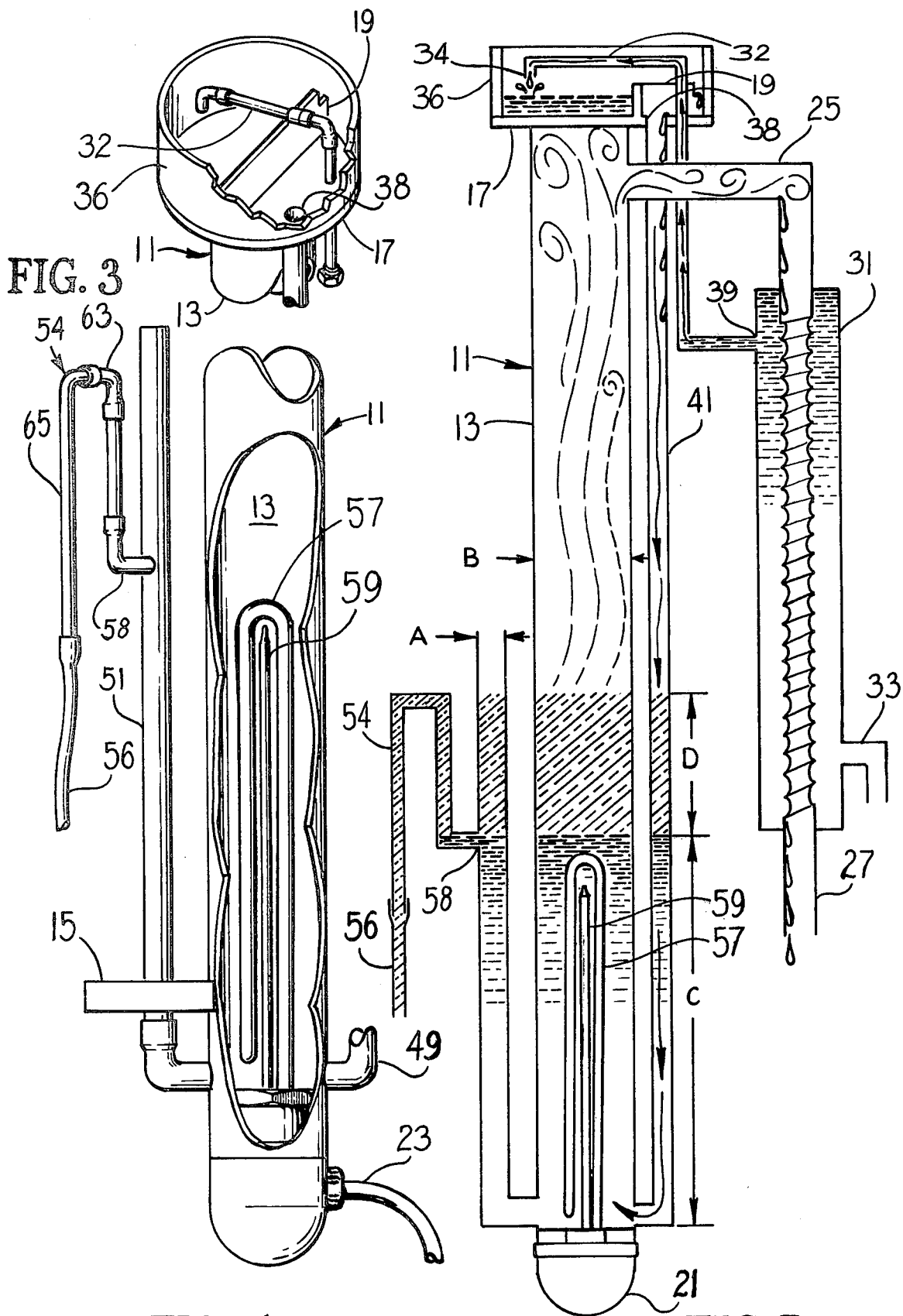
FIG. 3 is a perspective view of a top portion of the apparatus of FIGS. 1 and 2.
FIG. 4 is a front elevational detail view of a portion of the apparatus shown in FIGS. 1 and 2.
FIG. 5 is a schematic illustration of the various components of the apparatus of FIGS. 1 and 2 useful in explaining the operation thereof.

Referring to the drawings and in particular FIGS. 1 and 2, a distiller 11 is shown comprising a boiler tube 13 with brackets 15 for mounting the distiller on a wall surface. This is the preferred form of installation, although the distiller may also be placed on a stand or otherwise arranged in a vertical position as shown in FIG. 2. The vertical arrangement of the distiller permits gravity flow of input water and distilled water so that no pump is necessary.

As illustrated, the top of the boiler tube 13 is closed by the bottom 17 of an evaporator cup 36. The cup bottom 17 is welded to the top of tube 13. There is no absolute necessity for a tight seal at the top of tube 13, as this portion of the tube is occupied only by steam or vapors and the escape of a very small portion of the vapors would not be detrimental. The heater element base 21 closes the bottom of tube 13 as will be explained in the description of the heater apparatus. The heater apparatus line cord 23 passes into the heater base 21.

A condenser tube 25 opens into the boiler tube 13 near the top thereof but spaced slightly below the bottom 17 of cup 36. Condenser tube 25 is tapered at the lower end 27, at which end there is joined a section of flexible stainless steel tubing 29. Condenser tube 25 is also preferably circumferentially grooved in a helical pattern as shown; this shape produces better heat exchange between the interior and exterior of condenser tube 25. More distillate can be produced thereby or the distillate temperature will be lower or both.

Preferably, at least the boiler tube 13, the condenser tube 25, and the flexible tube 29 are all constructed of stainless steel so that there are no potentially contaminating materials in contact with the distilled water or with the steam which is condensed to produce the distilled water.

A water jacket 31 surrounds the condenser tube 25 and is provided with an inlet tube 33 at the lower end together with a control valve 35 having a control knob 37. In the usual installation, the household water is connected by a plastic tube to the inlet valve 35 to control the flow of water. Valve 35 or a separate valve (not shown) may be used to turn the water to the distiller off completely. At the top of cooling jacket 31 is an outlet 39 to a flexible tube 47 which conducts the input water from the top of the cooling jacket 31 up through tube 32, and outlet 34, into evaporator cup 36 around weir 19, through opening 38, tube 41 and inlet 49 to the bottom of boiler tube 13. Evaporator cup 36 functions to provide a shallow pool of preheated input water with large surface area exposed to the atmosphere. This serves to drive off volatile pollutants before the input water enters the boiler.

It should be noted in FIG. 4 that while it appears that the inlet into the boiler tube 13 is spaced from the bottom of the boiler tube, actually the heater base occupies the space below the inlet to 49 for the boiler 13 and the inlet tube 49 is placed substantially at the bottom of the water space in the boiler 13.

Directly opposite the water inlet 49 is overflow tube 51 which rises up the side of the boiler tube 13. Connected thereto is a smaller diameter siphon tube 54 with its inlet spaced down from the top of the overflow tube 51. The position of siphon inlet 58 and the siphon height control the minimum and maximum depths of the water in boiler tube 13. Flexible drain tube 56 receives the overflow from the end of siphon tube 54, and in usual practice flexible drain tube 56 will be conducted to a waste water drain, to a holding vessel, or possibly to some appliance such as a washing machine which may make use of the waste water from the distiller.

To facilitate cleaning the siphon for the distiller if necessary, the siphon 54 is preferably formed of two L-shaped parts as best seen in FIG. 1. Entry tube 63 fits into siphon inlet 58 and outlet tube 65 joins to the inlet tube 63 at the top of the siphon and empties into drain tube 56. Any suitable means for connection of tubes 63 and 65 and inlet 58 may be provided such as a snap fit or press fit junction with an O-ring seal; alternatively threaded connectors could be provided for these parts. With the siphon 54 capable of being disassembled as shown and described it may be readily disassembled and cleaned with a brush or a solvent.

As better seen in FIG. 1, an electric heater element 57 is provided for boiling water in boiler 13. Heater element 57 has a base 55 which is a relatively snug fit in the bottom of boiler 23. An O-ring 58 provides a watertight seal between base 55 and the inside wall of boiler tube 13. Base 55 is provided with a tapped hole to receive machine screw 68. Machine screw 68 passes through the opening 64 in boiler tube 13 and is threaded into the tapped opening (not shown) in heater base 55 to secure the heater in place in the boiler tube 13 and to close the bottom of the boiler tube in a water-tight manner. Preferably heater element 57 is provided with a thermostat (not shown) having a heat sensor 59. The thermostat and heat sensor prevent overheating of the heater element if the water level is low. Overheating of the boiler tube exterior surface is also prevented.

The distiller 11 is designed and constructed to minimize the necessity for cleaning the apparatus, but it will be noted that the provision for removing the heater and bottom cover permit easy access to the interior of boiler tube 13, and it can accordingly be cleaned as one would clean a gun barrel by forcing wadding or a swab in and out of the tube or by the use of brushes.

The open top of overflow tube 51 is also arranged to facilitate cleaning and a flexible brush may be provided to facilitate cleaning this and other portions of the apparatus. Of course, chemical cleaners could also be used for cleaning the apparatus, but this is not desirable or recommended and would rarely be necessary.

The operation of the apparatus is best understood by reference to FIG. 5 in which elements of the apparatus are shown schematically and are given the same numbers as in FIGS. 1 and 2.

The water to be purified enters the input tube 33 at the bottom of the cooling jacket 31. The rate at which water is supplied to this system will vary under different conditions and circumstances but may be on the order of one to ten fluid ounces per minute. The input water rises in the cooling jacket 31 and the conduit 32 to the level of the outlet 34. It may be noted that the water pressure required is minimal, being only that necessary to raise the water in cooling jacket 31 to the level of outlet 34. Water from outlet 34 drips or flows slowly into evaporator cup 36 where it is exposed to atmospheric pressure and further heated due to heat transfer through the bottom 17 of cup 36 from boiler tube 13. Conduit 41 connects to the overflow of cup 36 and to the bottom of boiler 13.

If the water supply to the apparatus is not on at all times that the heating element is on, the water in the boiler will boil away until the upper portion of the heating element is exposed and the temperature sensor reaches 250°. The temperature control will cycle so that the temperature does not go above 250° and the heating element does not burn out. The water continues to fill the apparatus until the water in the boiler tube 13 and in overflow tube 51 reaches the level of the top of the siphon 54. Water then spills from the distiller through siphon 54 and drain tube 56.

The siphon 54 has a relatively small bore of about ¼ inch and extends downwardly below the water level in boiler tube 13 and in overflow tube 51. Consequently, once the flow is started in siphon 54 it continues so long as the water level in overflow tube 51 is above the inlet 58 of siphon 54. The flow rate through siphon 54 is much greater than the metered flow rate through conduit 32 and in about half a minute siphon 54 will draw the water level in overflow tube 51, in boiler tube 13 and in conduit 41 to a point below the siphon inlet 58; siphon 54 them empties out and ceases to operate until the water level again reaches the top of siphon 54.

In operation, the water entering at 33 will be relatively cool, but it comes in contact with the condenser tube 25 which is, of course, heated by the steam from boiler tube 13. Thus the water in cooling jacket 31 is heated, and in general the temperature of water jacket 31 will be warmer as one moves up the wall of the jacket and quite hot at the top of the jacket near outlet 39.

While serving to absorb the heat from the steam from boiler 13 and thus condense it to liquid form, the inlet water is also heated before passing into evaporator cup 36, thereby conserving energy in the system.

The purpose of the overflow and siphon arrangement is to prevent buildup of minerals and impurities in the boiler water or on the boiler surfaces. The heater 57 is large enough to boil the water in the boiler vigorously. For example, in the apparatus shown, the heater is a 110 volt 1500 watt heater in the standard apparatus; it may be replaced with a 3000 watt heater operating on 220 volts, if one wishes to increase the output of the distiller. In either case, the water in the distiller has a depth of about 12 inches and the boiler diameter is about 4 inches so that substantial turbulence and mixing is generated in the boiler by the vigorous boiling induced by heater 57.

While a simple overflow of water taken from the bottom of boiler 13 is effective in removing dissolved and particulate pollutants in the boiler water and preventing their buildup, the siphon arrangement operating as explained above greatly enhances the effect of the overflow feature, especially with respect to particulate matter which may be precipitated in the boiler.

Preferably the dimensions of the siphon are arranged to produce a quantity of overflow in each cycle which will be fully adequate to flush out the bottom of the boiler and also the overflow tube 51. Referring to FIG. 5 the diameter of the boiler tube 13 is denoted with a B and the diameter of the overflow tube 51 with an A. The depth of the water in the boiler and the overflow tube at the lowest level is denoted by C and the difference in depth between the highest level and the lowest level is denoted by D. It will readily be seen that to produce ample flushing action especially in overflow tube 51 the quantity $B^2 \times D$ should be substantially (at least two times) greater than the quantity $A^2 \times C$. From this relationship the approximate dimensions D between the top of the siphon 54 and its inlet 58 may be determined. This will typically be from about one to several inches.

To the extent that there is any tendency for precipitates to settle to the bottom of the boiler, the placement of the overflow opening substantially at the bottom of the boiler is important in preventing any collection or buildup of solids in the boiler. It is particularly important to prevent buildup of solids at the inlet 49 and in the overflow tube 51. The placement of the inlet and the outlet at the bottom of the boiler with the inlet opposite the overflow has been found to be helpful in reducing the buildup of solids in the critical areas and thus lengthening the time between cleanings of the distiller. It may be noted that there is a slight increase in the rate of flow at the inlet to boiler tube 13 during the overflow discharge cycle due to the fact that the water level in tube 41 will drop by the amount indicated in FIG. 5; this amount of water will be added to the usual flow rate at the inlet to boiler tube 13. It has been found, unexpectedly, that it is not desirable to provide a trap for solids below the level of the outlet to overflow tube 51. The time between cleanings will vary according to water conditions, but even in adverse conditions, the distiller may be expected to run daily for six months without cleaning.

The importance of this self-cleaning feature cannot be underestimated, as the necessity for frequency cleaning will cause the average user to discontinue use of the distiller for substantial periods of time and return to the use of unpurified water with the adverse consequences that entails. The self-cleaning aspect of the distiller is also important to avoid selective buildup of pollutants in the boiler water. When the level of boiler water pollutants reaches a certain point, any distiller finally becomes ineffective in preventing vapors from the pollutants passing into the condensation chamber and thus contaminating the output of the distiller.

Preferably, the outer surface of the distiller, particularly the boiler tube 13, is chromium plated or otherwise provided with a bright surface to reduce radiation and heat loss from the apparatus. Portions of the boiler may be insulated if desired. The heating element 57 is submerged at all times during operation of the apparatus and thus is prevented from overheating. In addition, the heating element 57 is provided with a thermostatic control to turn off at a temperature somewhat above the boiling point of water; for example, about 250°. The thermostat prevents damage to the heating element if the water level inadvertently falls in the boiler. However, in the absence of some error in the operation of the apparatus the water always will be maintained between the levels determined by the top and the inlet of siphon 54.

The original adjustment of the water flow may proceed as follows.

The supply of water to the input 33 is turned on. This supply will typically be a saddle-tapping valve and a connecting tubing, the saddle-tapping valve being connected to a cold water pipe. The meter valve 35 is turned on and time is allowed for the unit to fill with water and for water to first commence overflowing through the drain tube. The time between successive overflow cycles produced by the intermittent siphon is measured. The meter valve is closed until there are about five minutes between water discharge cycles. The heater 57 is turned on by plugging the unit into the electrical power supply. After the unit has been operating for ten or fifteen minutes, the distilled water being produced should be cool-to-warm (80° F. to 120° F.) but not hot. Also, the bottom six inches of the condensing chamber 31 should be cool and the top six to ten inches should be hot. The time between overflow discharge cycles will be longer than before heater 57 was turned on. Adjustments in the meter valve are made as necessary to obtain the above-described conditions. Decreasing the time between cycles of water overflow will, of course, produce a cooler temperature for the condenser and for the output of the distiller. In certain areas with difficult water problems, it may be necessary to operate at higher temperatures than those previously indicated.

There is a very minor hazard of overflow from the evaporator cup 36 in the event that there is a plugging of the inlet 49. Therefore, as an optional feature the sidewall of cup 36 may be provided with an opening and a tubing, which may be flexible plastic tubing, leading to the top of overflow tube 51 so that in the event of blockage, the overflow from evaporator cup 36 would harmlessly drip into overflow 51 and be carried away in drain tube 56.

It may also be noted that the effectiveness of the distiller system is enhanced by the fact that the cooling jacket 31 acts as a settling vessel preventing any solid particulate matter in the water supply from entering the boiler. Although it is unlikely that the necessity would ever arise, any accumulation of solids in the cooling jacket 31 may be removed by back flushing the cooling jacket 31 with chemicals through outlet tube 39. Disconnecting tube 47 permits cleaning of tube 32 or 39.

From the foregoing description and explanation it will be seen that the distiller system illustrated and described provides an efficient source of highly purified water for human consumption or other purposes. It is quite energy-efficient, particularly when it is adjusted to produce a quantity of overflow water in the ratio of one or two to the quantity of distilled water. A most important feature of the apparatus is the infrequency of the necessity for cleaning. Cleaning in most cases will be required only after several hundred gallons or more of distilled water is produced. The smooth, clean-line construction of the boiler and other tubing facilitate cleaning the apparatus when necessary. The self-cleaning feature of the distiller not only lessens the necessity for dismantling and cleaning but also avoids the usual hazard of producing contaminated water due to a buildup of pollutants in a boiler, filters, or other paraphernalia. The preliminary evaporation stage provides enhanced removal of volatile pollutants by largely preventing their entry into the boiler.

Other modifications and variations of the apparatus in addition to those shown or suggested will be apparent to those skilled in the art and accordingly the scope of the invention is not to be deemed to be limited to the specific embodiments described or suggested, but it is rather to be determined by reference to the appended claims.

What is claimed is:

1. Distillation apparatus comprising,
   a boiler having at least one opening at the bottom thereof,
   a heater for heating the liquid content of said boiler,
   a vapor chamber,
   a condenser,
   an overflow tube connected to and extending upwardly from said opening at the bottom of said boiler, and
   a siphon connected to said overflow tube substantially above the level of said opening at the bottom of said boiler and having a U-shaped portion extending about its point of connection to said overflow tube but not above the top of said overflow tube.

2. Apparatus as recited in claim 1 further including an inlet to said boiler at the bottom thereof.

3. Apparatus as recited in claim 1 wherein said heater is an electric heater having a heating element extending upward into said boiler.

4. Apparatus as recited in claim 1 wherein said boiler and said vapor chamber form one continuous cylindrical chamber, the bottom of which is removable.

5. Apparatus as recited in claim 1 wherein said vapor chamber vertical dimension is at least four times its greatest horizontal dimension.

6. Apparatus as recited in claim 3 wherein said siphon connects to said overflow tube at a level above the top of said heater.

7. Apparatus as recited in claim 6 wherein said boiler and said vapor chamber form one continuous cylindrical chamber, the bottom of which is removable.

8. Apparatus as recited in claim 6 wherein said vapor chamber vertical dimension is at least four times its greatest horizontal dimension.

9. Distillation apparatus comprising,
   a boiler having at least one opening at the bottom thereof,
   an electric heater having a heating element extending upward into said boiler for heating the liquid content of said boiler,
   a vapor column in the form of a vertically elongated cylindrical chamber having a vertical dimension at least four times its greatest horizontal dimension receiving vapor produced in said boiler,
   a vapor column outlet near the top of said vapor column,
   a condenser adjacent said column with a central vapor channel and a surrounding liquid cooling jacket having an inlet and an outlet, the top of said channel being connected to said vapor column outlet and the bottom of said channel having a disstilled liquid outlet,
   means for conveying liquid from the outlet of said jacket to the bottom of said boiler,
   an overflow tube connected to said opening at the bottom of said boiler and extending upward to an opening to the atmosphere above the desired level of liquid in said boiler,
   and a siphon connected into said overflow tube at the vertical level of the minimum desired liquid level in said boiler and having an inverted U-shaped portion extending upward to the maximum desired liquid level in said boiler.

10. Apparatus as recited in claim 9 wherein said boiler and said vapor column form one continuous cylindrical chamber, at least one end of which is removable.

11. Distillation apparatus comprising,
    a boiler having at least one opening at the bottom thereof,
    an electric heater for heating the liquid content of said boiler,
    a vapor column in the form of a vertically elongated cylindrical chamber having a vertical dimension at least four times its greatest horizontal dimension receiving vapor produced in said boiler,
    a vapor column outlet near the top of said vapor column,
    a condenser with a surrounding liquid cooling jacket having an inlet and an outlet, the top of said channel being connected to said vapor column outlet,
    means for conveying liquid from the outlet of said jacket to the bottom of said boiler,
    an overflow tube connected to said opening at the bottom of said boiler and extending upward with an opening to the atmosphere,
    and an intermittent siphon connected into said overflow tube at the vertical level of the minimum desired liquid level in said boiler and having an inverted Ushaped portion extending upward to the maximum desired liquid level in said boiler.

12. Apparatus as recited in claim 11 wherein said boiler and said vapor volume form one continuous cylindrical chamber.

* * * * *